Patented Sept. 16, 1930

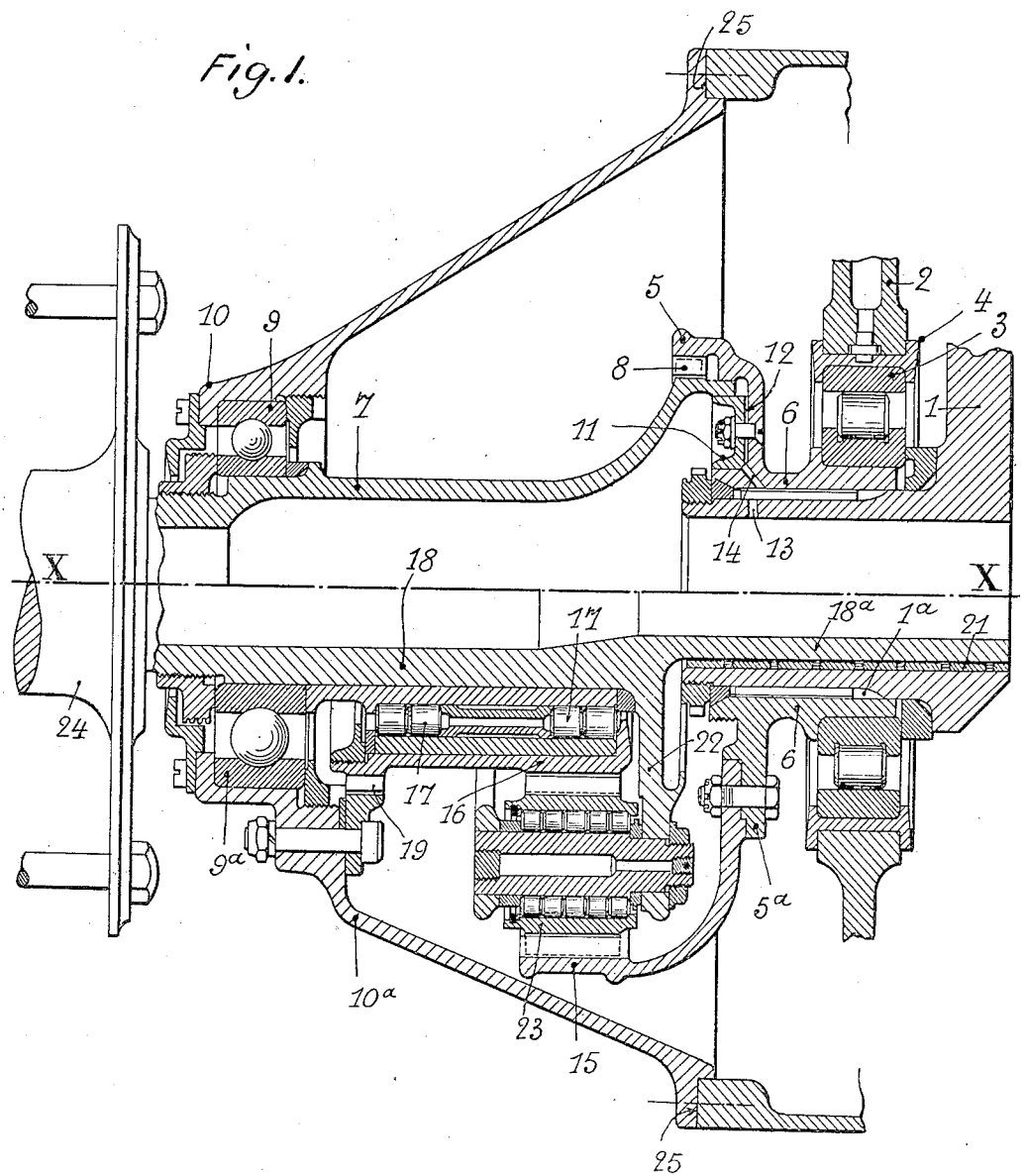

1,775,926

UNITED STATES PATENT OFFICE

MARIUS JEAN-BAPTISTE BARBAROU, OF PARIS, FRANCE

AIRCRAFT ENGINE

Application filed July 19, 1929, Serial No. 379,355, and in France May 24, 1929.

The invention relates to aircraft engines and more particularly to the means for connecting the crankshaft of the engine with the propeller, for driving the latter.

In the usual aircraft engines, when the propeller is directly driven by the crankshaft at the same speed as the latter, the hub of said propeller is usually secured to the front end of the crankshaft. In the engines provided with a speed-reducing gear, it is necessary to interpose between the crankshaft of the engine and the hub of the propeller a number of intermediate parts adapted to secure the proper speed reduction between the crankshaft and the propeller.

The mountings (casing, connection parts), in these two cases, are very different and are not interchangeable. Moreover, the distance between the propeller hub and the front end of the engine varies according to the type of mounting. However, it may be desirable to change the normal speed of flight of a given aircraft (that is to pass from the direct drive to the speed reduction drive) and to compare the performances of the aircraft in both cases.

The solution which consists in changing the engine is troublesome and sometimes impossible without changing the engine covering. Furthermore, a great number of different parts have to be machined which increases the machinery and hence the cost of manufacture.

This invention has chiefly for its object to provide an improved engine and propeller unit which may be readily adapted either for the direct drive or for the speed reduction drive, that is, the engine being mounted upon the aircraft with all the accessories and auxiliary devices and being entirely enclosed by the covering, said engine may be readily adapted for the direct drive of the speed reduction drive, simply by changing the front part of said engine. Such an arrangement affords the possibility of increasing the range of tests without increasing the material and without any modifications of the engine parts on the one hand, and important savings, due to the reduction of the number of parts to be machined, on the other hand.

Fig. 1 is a longitudinal sectional view, the portion above the line X—X illustrating the upper front part of an engine adapted for direct drive, and the portion below said line illustrating the lower front part of an engine adapted for speed reduction drive.

In the constructional form herein represented, the front end of the crankshaft 1 is mounted in the crankcase 2 by means of a roller bearing 3, held in place by means of a double flanged member 4. The front end of the crankshaft is formed with flutes $1^a$, adapted to be operatively connected with the parts which are disposed in front of the crankcase.

Whichever be the type of drive, the unit comprising the crankshaft 1, the crankcase 2, the roller bearing 3 and member 4 remains unchanged.

For the direct drive (upper half of the figure), a toothed annulus 5, having a hub 6, centered by the roller bearing 3, is shifted on the end of the crankshaft 1, said hub having flutes which cooperate with the flutes $1^a$ of crankshaft 1. The propeller shaft 7 is driven by annulus 5, by means of teeth or flutes adapted to center said shaft. A thrust ball bearing 9, mounted in the gear casing 2, is adapted to support the front end of the propeller shaft and the rear face 25 of casing 10 is accurately surfaced to fit upon a corresponding part of the crankcase 2. A disc or plate 11 is bolted to the annulus 5 and is formed with radial ducts 12 adapted to supply lubricant, which flows from the hollow crankshaft through ducts 13 and 14, between annulus 5 and propeller shaft 7, in order to produce between the surfaces in contact, where the annulus and the shaft are mutually centered and driven, a thin layer of lubricant adapted to obviate pounding down of the parts.

For the speed reduction drive (lower half of the figure) use is made of a disc $5^a$, having a hub 6, similar to the preceding, shifted on the end of the crankshaft and centered by the roller bearing 3. Said disc is driven by means of flutes, as in the preceding case. To disc 5ᵃ is bolted the outer annulus 15 of an epicyclic reducing gear. The stationary sun wheel 16 of the latter is centered by means of roller bearings 17 on the propeller shaft 18 and is connected with the gear casing 10ᵃ by means of teeth or flutings 19, casing 10ᵃ being secured to the crankcase 2 in the same manner as casing 10 in the preceding case.

The propeller shaft 18 is centered by means of a tail portion 18ᵃ, fitting within the hollow crankshaft, 1, through the medium of an anti-friction metal bearing 21. Integral with said propeller shaft is a disc 22, which forms a support for the spindles of the planetary pinions 23. A thrust ball bearing 9ᵃ supports the front end of the propeller shaft and is mounted in the gear casing 10ᵃ.

It will be seen that in both cases the propeller hub 24 is located at the same distance from the front end face 25 of the crankcase 2, which may be assembled with anyone of the mountings above described.

Having now described my invention what I claim as new and desire to secure by Letters Patent is:

In combination with an aircraft engine embodying a crankcase and a crankshaft having a hollow end projecting from said crankcase and formed with external flutes, a propeller, and two interchangeable units adapted to be detachably connected with said crankcase, the first unit for direct drive comprising a propeller shaft, provided with a disc portion having flutes at one end adapted to engage said flutes of said crankshaft, and a shaft portion adapted to receive the propeller and connected by flutes with said disc portion, said disc portion having radial ducts registering with radial ducts of said crankshaft, means for forcing lubricant through said crankshaft and said ducts to the flutes which connect said disc portion with said shaft portion, a casing adapted to be detachably secured to said crankcase and to support the propeller end of said propeller shaft, and the second unit, for speed reduction drive, comprising a propeller shaft adapted to receive the propeller at one end and having an extension at the opposite end adapted to fit within said hollow end of said crankshaft, a casing adapted to be detachably secured to said crankcase and to support the propeller end of said propeller shaft, and a speed reducing gear within said casing, one member of said gear being connected with said propeller shaft, another member with said casing and a further member having a fluted extension adapted to engage the flutes of said crankshaft.

In testimony whereof I have signed my name to this specification.

MARIUS JEAN-BAPTISTE BARBAROU.